US011217021B2

(12) United States Patent
Motta et al.

(10) Patent No.: US 11,217,021 B2
(45) Date of Patent: Jan. 4, 2022

(54) DISPLAY SYSTEM HAVING SENSORS

(71) Applicant: Apple Inc., Cupertino, CA (US)

(72) Inventors: Ricardo J. Motta, Palo Alto, CA (US);
Brett D. Miller, Redwood City, CA (US); Tobias Rick, Mountainview, CA (US); Manohar B. Srikanth, Mountainview, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/361,110

(22) Filed: Mar. 21, 2019

(65) Prior Publication Data

US 2019/0221044 A1 Jul. 18, 2019

Related U.S. Application Data

(63) Continuation of application No. PCT/US2017/053100, filed on Sep. 22, 2017, which is a continuation of application No. 15/711,992, filed on Sep. 21, 2017, now abandoned.

(Continued)

(51) Int. Cl.
*G06T 19/00* (2011.01)
*H04N 13/383* (2018.01)
(Continued)

(52) U.S. Cl.
CPC ........ *G06T 19/006* (2013.01); *G02B 27/0093* (2013.01); *G02B 27/0172* (2013.01);
(Continued)

(58) Field of Classification Search
CPC .. G06T 19/006; H04N 13/344; H04N 13/383; G02B 27/0093; G02B 27/0172;
(Continued)

(56) References Cited

U.S. PATENT DOCUMENTS 9,304,003 B1 4/2016 Ashman et al.
10,914,957 B1 * 2/2021 Stahl .................. G06F 3/013
(Continued)

FOREIGN PATENT DOCUMENTS

EP 2879022 6/2015
KR 10-1614315 2/2016
(Continued)

OTHER PUBLICATIONS

Korean Intellectual Property Office Notice of Preliminary Rejection from Application No. 10-2019-7005049, (English translation and Korean version), dated Apr. 16, 2020, pp. 1-9.

(Continued)

*Primary Examiner* — Chante E Harrison
(74) *Attorney, Agent, or Firm* — Robert C. Kowert; Kowert, Hood, Munyon, Rankin & Goetzel, P.C.

(57) ABSTRACT

A mixed reality system that includes a head-mounted display (HMD) that provides 3D virtual views of a user's environment augmented with virtual content. The HMD may include sensors that collect information about the user's environment (e.g., video, depth information, lighting information, etc.), and sensors that collect information about the user (e.g., the user's expressions, eye movement, hand gestures, etc.). The sensors provide the information as inputs to a controller that renders frames including virtual content based at least in part on the inputs from the sensors. The HMD may display the frames generated by the controller to provide a 3D virtual view including the virtual content and a view of the user's environment for viewing by the user.

20 Claims, 5 Drawing Sheets

Related U.S. Application Data

(60) Provisional application No. 62/398,437, filed on Sep. 22, 2016.

(51) Int. Cl.
*G06F 1/16* (2006.01)
*G06F 3/01* (2006.01)
*G02B 27/00* (2006.01)
*H04N 13/344* (2018.01)
*G02B 27/01* (2006.01)

(52) U.S. Cl.
CPC .............. *G06F 1/163* (2013.01); *G06F 3/011* (2013.01); *G06F 3/012* (2013.01); *G06F 3/013* (2013.01); *G06F 3/015* (2013.01); *G06F 3/017* (2013.01); *H04N 13/344* (2018.05); *H04N 13/383* (2018.05); *G02B 2027/014* (2013.01); *G02B 2027/0136* (2013.01); *G02B 2027/0138* (2013.01); *G02B 2027/0187* (2013.01)

(58) Field of Classification Search
CPC ...... G02B 2027/0187; G02B 2027/014; G02B 2027/0138; G02B 2027/0136; G06F 3/017; G06F 3/015; G06F 3/013; G06F 3/012; G06F 3/011; G06F 1/163
See application file for complete search history.

(56) References Cited

U.S. PATENT DOCUMENTS

| | | | |
|---|---|---|---|
| 11,036,284 B2* | 6/2021 | Himane | G06T 7/70 |
| 2012/0229248 A1 | 9/2012 | Parshionikar et al. | |
| 2014/0237366 A1* | 8/2014 | Poulos | G06F 3/013 715/728 |
| 2014/0364212 A1* | 12/2014 | Osman | G06F 3/013 463/31 |
| 2015/0310263 A1* | 10/2015 | Zhang | G06K 9/00315 382/103 |
| 2016/0049012 A1 | 2/2016 | Torii et al. | |
| 2016/0371886 A1* | 12/2016 | Thompson | G02B 27/0172 |
| 2017/0337750 A1* | 11/2017 | McKenzie | G06F 3/016 |
| 2017/0372516 A1* | 12/2017 | Evans | G06T 15/20 |
| 2018/0082482 A1* | 3/2018 | Motta | G02B 27/0172 |
| 2019/0094981 A1* | 3/2019 | Bradski | H04N 13/204 |
| 2019/0102927 A1* | 4/2019 | Yokokawa | G06T 13/40 |
| 2019/0342632 A1* | 11/2019 | DeFaria | H04N 21/8146 |
| 2019/0368868 A1* | 12/2019 | Abovitz | A63F 13/428 |
| 2020/0097072 A1* | 3/2020 | Lyren | G06F 3/011 |
| 2020/0186775 A1* | 6/2020 | Lin | H04N 13/383 |

FOREIGN PATENT DOCUMENTS

| | | |
|---|---|---|
| KR | 10-2016-0022921 | 3/2016 |
| KR | 1020170035958 | 3/2017 |
| WO | 2013067230 | 5/2013 |
| WO | 2014209709 | 12/2014 |
| WO | 2016073986 | 5/2016 |

OTHER PUBLICATIONS

Notice of Allowance from Korean Patent Application No. 10-2019-7005049, dated Jan. 22, 2021, (Korean Version only), pp. 1-2.

* cited by examiner

DISPLAY SYSTEM HAVING SENSORS

This application is a continuation of International Application No. PCT/US2017/053100, filed Sep. 22, 2017, which claims benefit of priority to U.S. application Ser. No. 15/711,992, filed Sep. 21, 2017 and U.S. Provisional Patent Application No. 62/398,437, filed Sep. 22, 2016. The above applications are incorporated herein by reference. To the extent that any material in the incorporated application conflicts with material expressly set forth herein, the material expressly set forth herein controls.

BACKGROUND

Virtual reality (VR) allows users to experience and/or interact with an immersive artificial environment, such that the user feels as if they were physically in that environment. For example, virtual reality systems may display stereoscopic scenes to users in order to create an illusion of depth, and a computer may adjust the scene content in real-time to provide the illusion of the user moving within the scene. When the user views images through a virtual reality system, the user may thus feel as if they are moving within the scenes from a first-person point of view. Similarly, mixed reality (MR) combines computer generated information (referred to as virtual content) with real world images or a real world view to augment, or add content to, a user's view of the world. The simulated environments of virtual reality and/or the mixed environments of augmented reality may thus be utilized to provide an interactive user experience for multiple applications, such as applications that add virtual content to a real-time view of the viewer's environment, interacting with virtual training environments, gaming, remotely controlling drones or other mechanical systems, viewing digital media content, interacting with the Internet, or the like.

SUMMARY

Embodiments of a mixed reality system are described that may include a mixed reality device such as a headset, helmet, goggles, or glasses (referred to herein as a head-mounted display (HMD)) that includes a projector mechanism for projecting or displaying frames including left and right images to a user's eyes to thus provide 3D virtual views to the user. The 3D virtual views may include views of the user's environment augmented with virtual content (e.g., virtual objects, virtual tags, etc.). The mixed reality system may include world-facing sensors that collect information about the user's environment (e.g., video, depth information, lighting information, etc.), and user-facing sensors that collect information about the user (e.g., the user's expressions, eye movement, hand gestures, etc.). The sensors provide the information as inputs to a controller of the mixed reality system. The controller may render frames including virtual content based at least in part on the inputs from the world and user sensors. The controller may be integrated in the HMD, or alternatively may be implemented at least in part by a device external to the HMD. The HMD may display the frames generated by the controller to provide a 3D virtual view including the virtual content and a view of the user's environment for viewing by the user.

In some embodiments, the sensors may include one or more cameras that capture high-quality views of the user's environment that may be used to provide the user with a virtual view of their real environment. In some embodiments, the sensors may include one or more sensors that capture depth or range information for the user's environment. In some embodiments, the sensors may include one or more sensors that may capture information about the user's position, orientation, and motion in the environment. In some embodiments, the sensors may include one or more cameras that capture lighting information (e.g., direction, color, intensity) in the user's environment that may, for example, be used in rendering (e.g., coloring and/or lighting) content in the virtual view. In some embodiments, the sensors may include one or more sensors that track position and movement of the user's eyes. In some embodiments, the sensors may include one or more sensors that track position, movement, and gestures of the user's hands, fingers, and/or arms. In some embodiments, the sensors may include one or more sensors that track expressions of the user's eyebrows/forehead. In some embodiments, the sensors may include one or more sensors that track expressions of the user's mouth/jaw.

Figure 1:
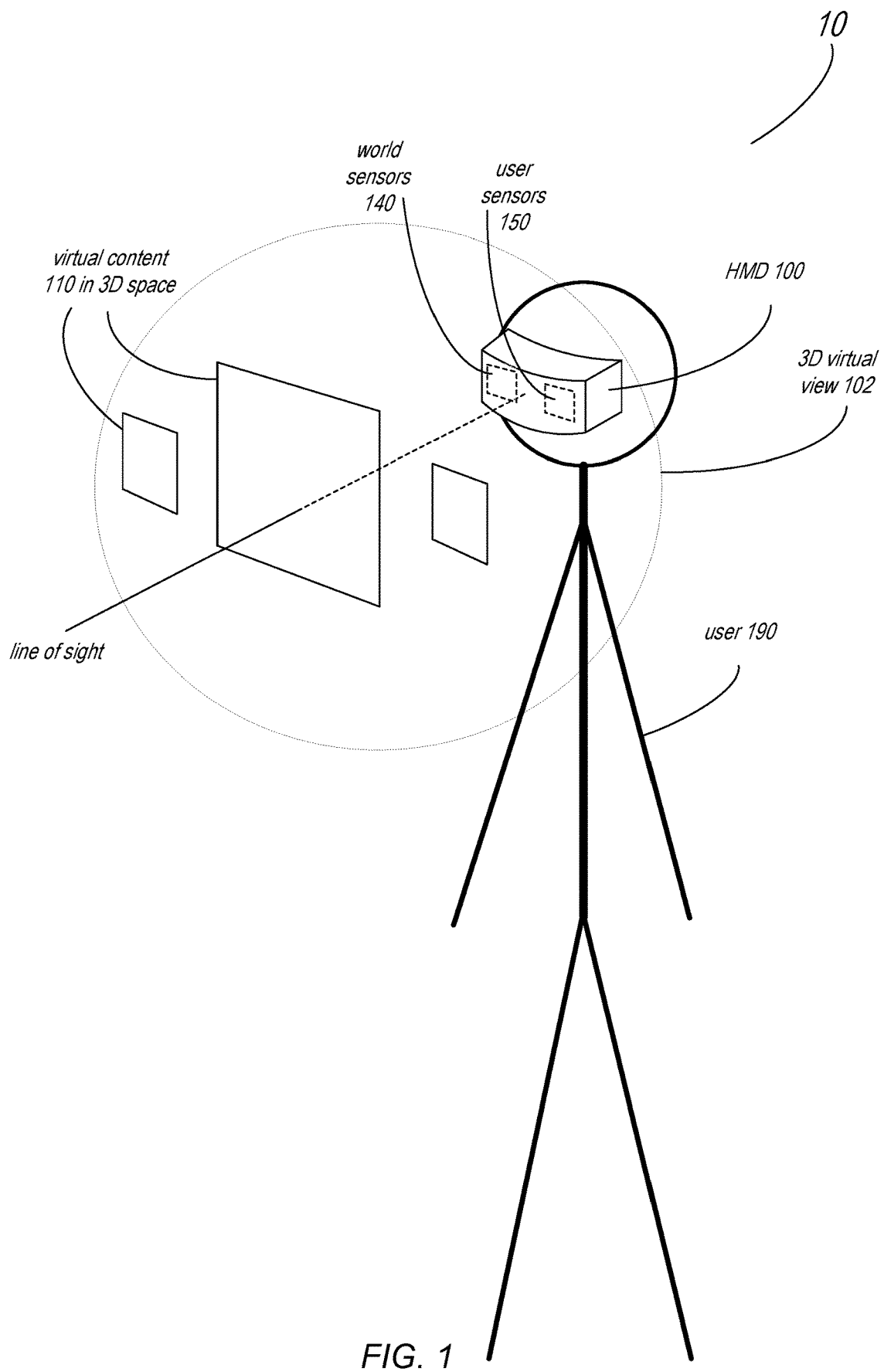
FIG. 1 illustrates a mixed reality system, according to at least some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for generating mixed reality views for users are described. Embodiments of a mixed reality system are described that may include a mixed reality device such as a headset, helmet, goggles, or glasses (referred to herein as a head-mounted display (HMD)) that includes a projector mechanism for projecting or displaying frames including left and right images to a user's eyes to thus provide 3D virtual views to the user. The 3D virtual views may include views of the user's environment augmented with virtual content (e.g., virtual objects, virtual tags, etc.). The mixed reality system may also include world-facing sensors that collect information about the user's environment (e.g., video, depth information, lighting information, etc.), and user-facing sensors that collect information about the user (e.g., the user's expressions, eye movement, hand gestures, etc.). The sensors may provide the collected information to a controller of the mixed reality system. The controller may render frames for display by the projector that include virtual content based at least in part on the various information obtained from the sensors.

As noted above, the mixed reality system may include world-facing sensors (also referred to as world sensors), for example located on external surfaces of a mixed reality HMD, that collect various information about the user's environment. In some embodiments, the world sensors may include one or more "video see through" cameras (e.g., RGB (visible light) cameras) that capture high-quality views of the user's environment that may be used to provide the user with a virtual view of their real environment. In some embodiments, the world sensors may include one or more world mapping sensors (e.g., infrared (IR) cameras with an IR illumination source, or Light Detection and Ranging (LIDAR) emitters and receivers/detectors) that, for example, capture depth or range information for the user's environment. In some embodiments, the world sensors may include one or more "head pose" sensors (e.g., IR or RGB cameras) that may capture information about the user's position, orientation, and motion in the environment; this information may, for example, be used to augment information collected by an inertial-measurement unit (IMU) of the HMD. In some embodiments, the world sensors may include one or more light sensors (e.g., RGB cameras) that capture lighting information (e.g., color, intensity, and direction) in the user's environment that may, for example, be used in rendering lighting effects for virtual content in the virtual view.

As noted above, the mixed reality system may include user-facing sensors (also referred to as user sensors), for example located on external and internal surfaces of a mixed reality HMD, that collect information about the user (e.g., the user's expressions, eye movement, etc.). In some embodiments, the user sensors may include one or more eye tracking sensors (e.g., IR cameras with IR illumination, or visible light cameras) that track position and movement of the user's eyes. In the case of visible light (RGB) cameras, the eye tracking sensors may also be used for other purposes, for example iris identification. In some embodiments, the user sensors may include one or more hand sensors (e.g., IR cameras with IR illumination) that track position, movement, and gestures of the user's hands, fingers, and/or arms. In some embodiments, the user sensors may include one or more eyebrow sensors (e.g., IR cameras with IR illumination) that track expressions of the user's eyebrows/forehead. In some embodiments, the user sensors may include one or more lower jaw tracking sensors (e.g., IR cameras with IR illumination) that track expressions of the user's mouth/jaw.

FIG. 1 illustrates a mixed reality system 10, according to at least some embodiments. In some embodiments, a mixed reality system 10 may include a HMD 100 such as a headset, helmet, goggles, or glasses that may be worn by a user 190. In some embodiments, virtual content 110 may be displayed to the user 190 in a 3D virtual view 102 via the HMD 100; different virtual objects may be displayed at different depths in the virtual space 102. In some embodiments, the virtual content 110 may be overlaid on or composited in a view of the user 190's environment with respect to the user's current line of sight that is provided by the HMD 100.

HMD 100 may implement any of various types of virtual reality projection technologies. For example, HMD 100 may be a near-eye VR system that projects left and right images on screens in front of the user 190's eyes that are viewed by a subject, such as DLP (digital light processing), LCD (liquid crystal display) and LCoS (liquid crystal on silicon) technology VR systems. As another example, HMD 100 may be a direct retinal projector system that scans left and right images, pixel by pixel, to the subject's eyes. To scan the images, left and right projectors generate beams that are directed to left and right reflective components (e.g., ellipsoid mirrors) located in front of the user 190's eyes; the reflective components reflect the beams to the user's eyes. To create a three-dimensional (3D) effect, virtual content 110 at different depths or distances in the 3D virtual view 102 are shifted left or right in the two images as a function of the triangulation of distance, with nearer objects shifted more than more distant objects.

The HMD 100 may include world sensors 140 that collect information about the user 190's environment (video, depth information, lighting information, etc.), and user sensors 150 that collect information about the user 190 (e.g., the user's expressions, eye movement, hand gestures, etc.). The sensors 140 and 150 may provide the collected information to a controller of the mixed reality system 10. The controller may render frames for display by a projector component of the HMD 100 that include virtual content based at least in part on the various information obtained from the sensors 140 and 150. Example sensors 140 and 150 are shown in FIGS. 2A through 2C.

While not shown in FIG. 1, in some embodiments the mixed reality system 10 may include one or more other components. For example, the system may include a cursor control device (e.g., mouse) for moving a virtual cursor in the 3D virtual view 102 to interact with virtual content 110. As another example, in some embodiments, the system 10 may include a computing device coupled to the HMD 100 via a wired or wireless (e.g., Bluetooth) connection that implements at least some of the functionality of the HMD 100, for example rendering images and image content to be displayed in the 3D virtual view 102 by the HMD 100.

Figure 2A:
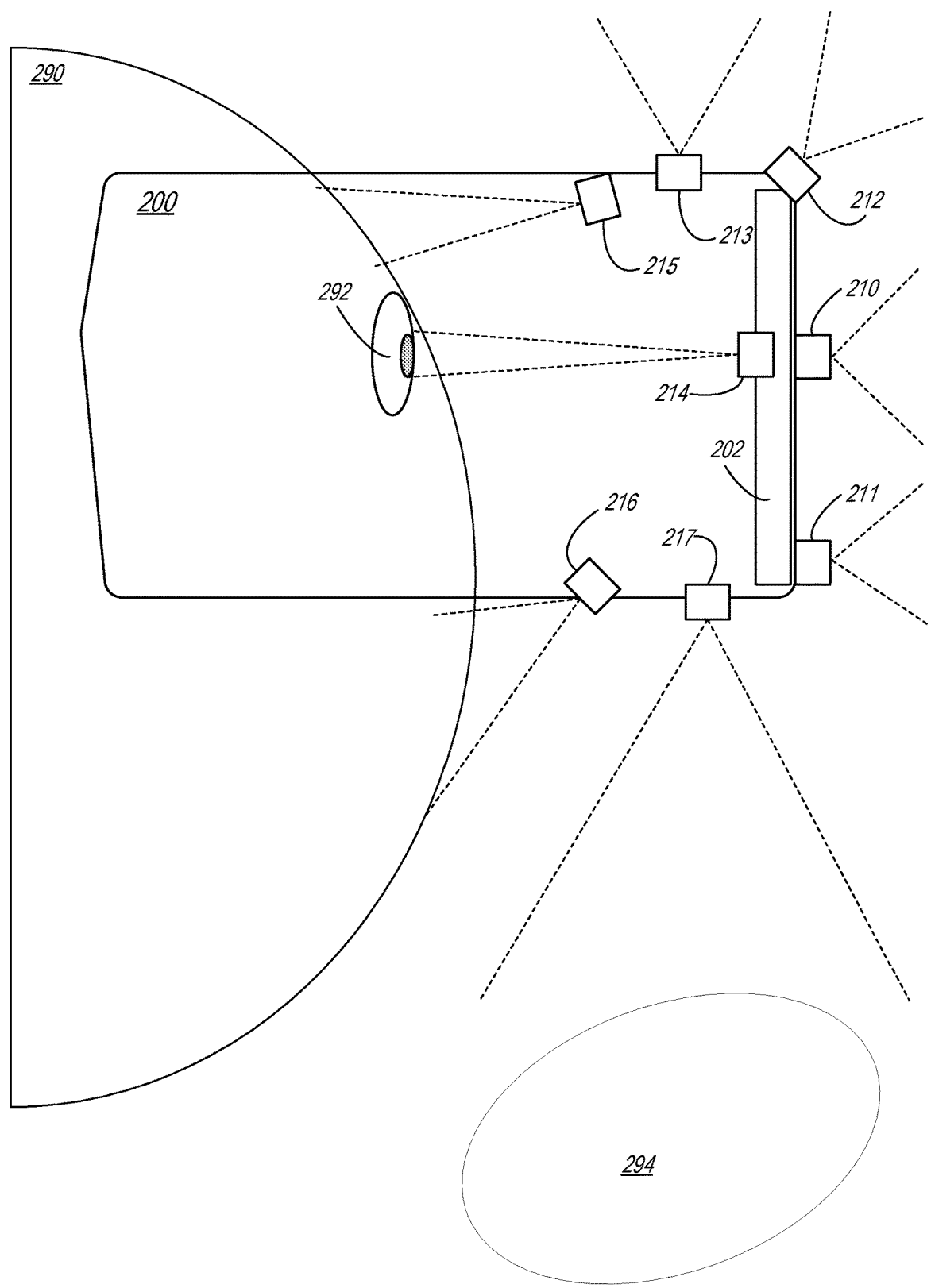
FIGS. 2A through 2C illustrate world-facing and user-facing sensors of a head-mounted display (HMD), according to at least some embodiments.
Figure 2B:
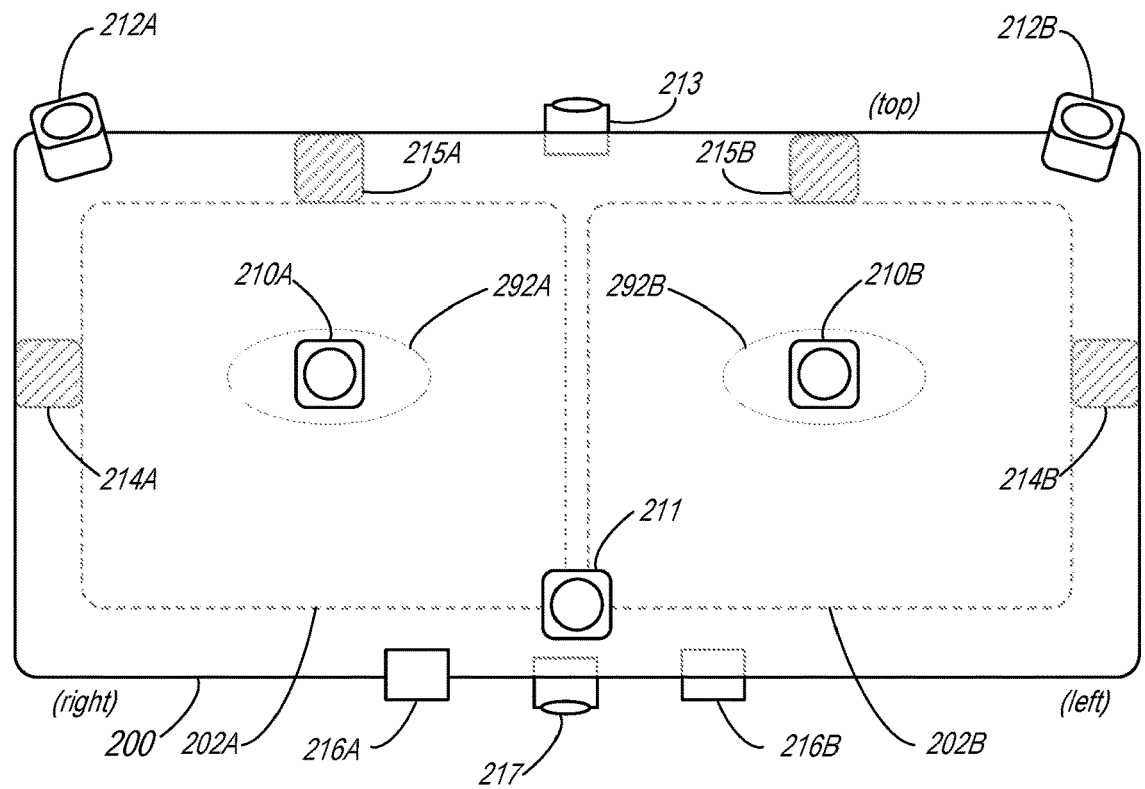
Figure 2C:
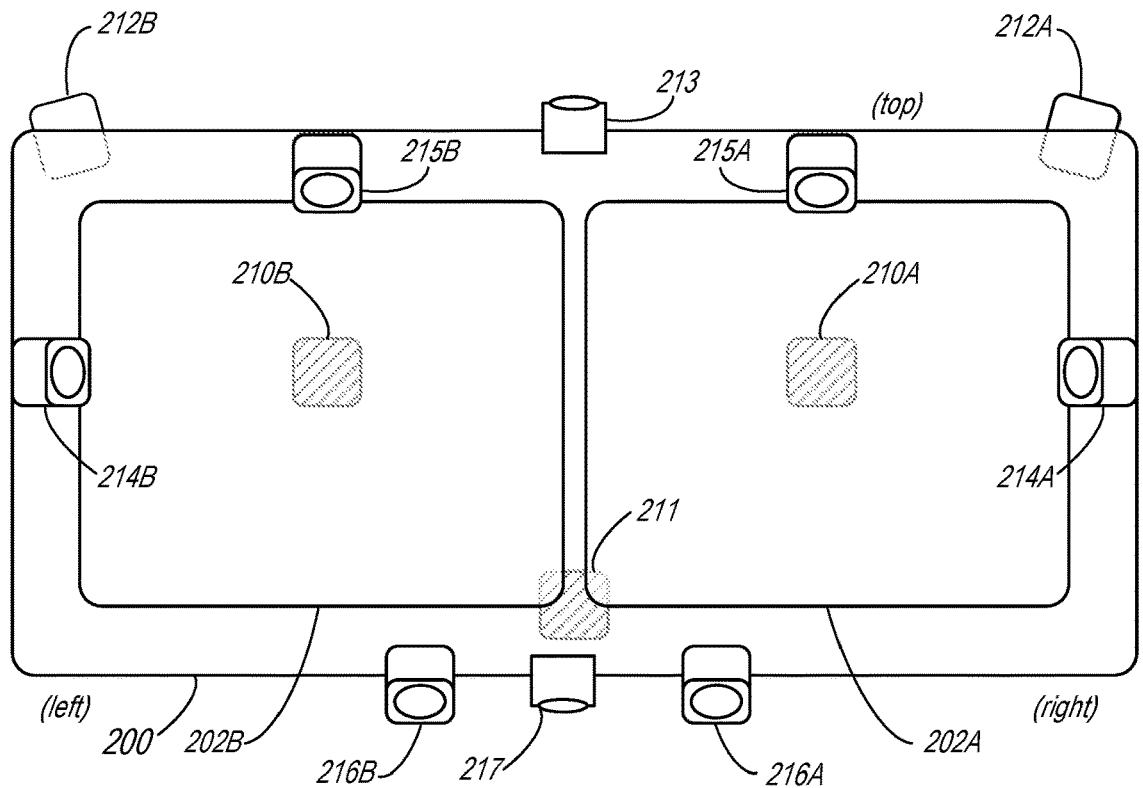

FIGS. 2A through 2C illustrate world-facing and user-facing sensors of an example HMD 200, according to at least some embodiments. FIG. 2A shows a side view of an example HMD 200 with world and user sensors 210-217, according to some embodiments. FIG. 2B shows a front (world-facing) view of an example HMD 200 with world and user sensors 210-217, according to some embodiments. FIG. 2C shows a rear (user-facing) view of an example HMD 200 with world and user sensors 210-217, according to some embodiments. Note that HMD 200 as illustrated in FIGS. 2A through 2C is given by way of example, and is not intended to be limiting. In various embodiments, the shape, size, and other features of a HMD may differ, and the locations, numbers, types, and other features of the world and user sensors may vary.

Figure 4:
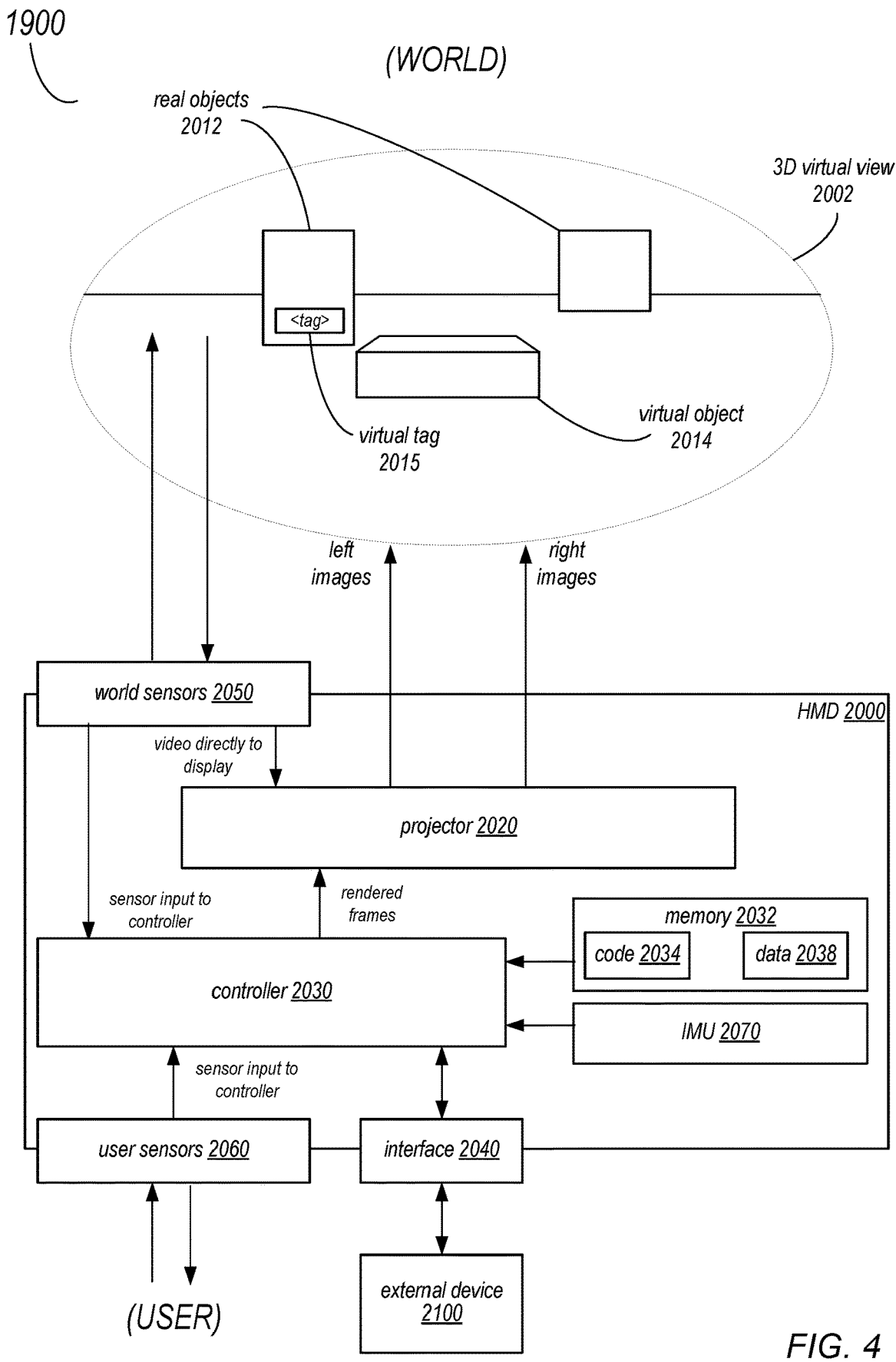
FIG. 4 illustrates components of a mixed reality system, according to at least some embodiments.

As shown in FIGS. 2A through 2C, HMD 200 may be worn on a user 290's head so that the projection system displays 202 (e.g. screens and optics of a near-eye VR system, or reflective components (e.g., ellipsoid mirrors) of a direct retinal projector system) are disposed in front of the user 290's eyes 292. In some embodiments, a HMD 200 may include world sensors 210-213 that collect information about the user 290's environment (video, depth information, lighting information, etc.), and user sensors 214-217 that collect information about the user 290 (e.g., the user's expressions, eye movement, hand gestures, etc.). The sensors 210-217 may provide the collected information to a controller (not shown) of the mixed reality system. The controller may be implemented in the HMD 200, or alternatively may be implemented at least in part by an external device (e.g., a computing system) that is communicatively coupled to HMD 200 via a wired or wireless interface. The controller may include one or more of various types of processors, image signal processors (ISPs), graphics processing units (GPUs), coder/decoders (codecs), and/or other components for processing and rendering video and/or images. The controller may render frames (each frame including a left and right image) that include virtual content based at least in part on the various inputs obtained from the sensors 210-217, and may provide the frames to the projection system of the HMD 200 for display to the left and right displays 202. FIG. 4 further illustrates components of a HMD and mixed reality system, according to some embodiments.

World sensors 210-213 may, for example, be located on external surfaces of a HMD 200, and may collect various information about the user's environment. In some embodiments, the information collected by the world sensors may be used to provide the user with a virtual view of their real environment. In some embodiments, the world sensors may be used to provide depth information for objects in the real environment. In some embodiments, the world sensors may be used to provide orientation and motion information for the user in the real environment. In some embodiments, the world sensors may be used to collect color and lighting information in the real environment.

In some embodiments, the world sensors may include one or more "video see through" cameras 210 (e.g., RGB (visible light) video cameras) that capture high-quality video of the user's environment that may be used to provide the user with a virtual view of their real environment. In some embodiments, video streams captured by cameras 210A and 210B may be processed by the controller of the HMD 200 to render frames including virtual content, and the rendered frames may be provided to the projection system of the device for display on respective displays 202A and 202B. However, note that in some embodiments, to reduce latency for the virtual view of the world that is displayed to the user 290, at least some video frames captured by cameras 210A and 210B may go directly to the projection system of the device for display on respective displays 202A and 202B; the controller may also receive and process the video frames to composite virtual content into the frames that are then provided to the projection system for display.

As shown in the non-limiting example HMD 200 of FIGS. 2A through 2C, in some embodiments there may be two video see through cameras 210A and 210B located on a front surface of the HMD 200 at positions that are substantially in front of each of the user 290's eyes 292A and 292B. However, in various embodiments, more or fewer cameras 210 may be used in a HMD 200 to capture video of the user 290's environment, and cameras 210 may be positioned at other locations. In an example non-limiting embodiment, video see through cameras 210 may include high quality, high resolution RGB video cameras, for example 10 megapixel (e.g., 3072×3072 pixel count) cameras with a frame rate of 60 frames per second (FPS) or greater, horizontal field of view (HFOV) of greater than 90 degrees, and with a working distance of 0.1 meters (m) to infinity.

In some embodiments, the world sensors may include one or more world mapping sensors 211 (e.g., infrared (IR) cameras with an IR illumination source, or Light Detection and Ranging (LIDAR) emitters and receivers/detectors) that, for example, capture depth or range information for objects and surfaces in the user's environment. The range information may, for example, be used in positioning virtual content composited into images of the real environment at correct depths. In some embodiments, the range information may be used in adjusting the depth of real objects in the environment when displayed; for example, nearby objects may be re-rendered to be smaller in the display to help the user in avoiding the objects when moving about in the environment.

As shown in the non-limiting example HMD 200 of FIGS. 2A through 2C, in some embodiments there may be one world mapping sensor 211 located on a front surface of the HMD 200. However, in various embodiments, more than one world mapping sensor 211 may be used, and world mapping sensor 211 may be positioned at other locations. In an example non-limiting embodiment, a world mapping sensor 211 may include an IR light source and IR camera, for example a 1 megapixel (e.g., 1000×1000 pixel count) camera with a frame rate of 60 frames per second (FPS) or greater, HFOV of 90 degrees or greater, and with a working distance of 0.1 m to 1.5 m.

In some embodiments, the world sensors may include one or more "head pose" sensors 212 (e.g., IR or RGB cameras) that may capture information about the position, orientation, and/or motion of the user and/or the user's head in the environment. The information collected by sensors 212 may, for example, be used to augment information collected by an inertial-measurement unit (IMU) of the HMD 200. The augmented position, orientation, and/or motion information may be used in determining how to render and display virtual views of the user's environment and virtual content within the views. For example, different views of the environment may be rendered based at least in part on the position or orientation of the user's head, whether the user is currently walking through the environment, and so on. As another example, the augmented position, orientation, and/or motion information may be used to composite virtual content into the scene in a fixed position relative to the background view of the user's environment.

As shown in the non-limiting example HMD 200 of FIGS. 2A through 2C, in some embodiments there may be two head pose sensors 212A and 212B located on a front or top surface of the HMD 200. However, in various embodiments, more or fewer sensors 212 may be used, and sensors 212 may be positioned at other locations. In an example non-limiting embodiment, head pose sensors 212 may include RGB or IR cameras, for example 400×400 pixel count cameras, with a frame rate of 120 frames per second (FPS) or greater, wide field of view (FOV), and with a working distance of 1 m to infinity. The sensors 212 may include wide FOV lenses, and the two sensors 212A and 212B may look in different directions. The sensors 212 may provide low latency monochrome imaging for tracking head position, and may be integrated with an IMU of the HMD 200 to augment position and movement information captured by the IMU.

In some embodiments, the world sensors may include one or more light sensors 213 (e.g., RGB cameras) that capture lighting information (e.g., direction, color, and intensity) in the user's environment that may, for example, be used in rendering virtual content in the virtual view of the user's environment, for example in determining coloring, lighting, shadow effects, etc. for virtual objects in the virtual view. For example, if a red light source is detected, virtual content rendered into the scene may be illuminated with red light, and more generally virtual objects may be rendered with light of a correct color and intensity from a correct direction and angle.

As shown in the non-limiting example HMD 200 of FIGS. 2A through 2C, in some embodiments there may be one light sensor 213 located on a front or top surface of the HMD 200. However, in various embodiments, more than one light sensor 213 may be used, and light sensor 213 may be positioned at other locations. In an example non-limiting embodiment, light sensor 213 may include an RGB high dynamic range (HDR) video camera, for example a 500×500 pixel count camera, with a frame rate of 30 FPS, HFOV of 180 degrees or greater, and with a working distance of 1 m to infinity.

User sensors 214-217 may, for example, be located on external and internal surfaces of HMD 200, and may collect information about the user 290 (e.g., the user's expressions, eye movement, etc.). In some embodiments, the information collected by the user sensors may be used to adjust the collection of, and/or processing of information collected by, the world sensors 210-213 of the HMD 200. In some embodiments, the information collected by the user sensors may be used to adjust the rendering of images to be projected, and/or to adjust the projection of the images by the projection system of the HMD 200. In some embodiments, the information collected by the user sensors may be used in generating an avatar of the user 290 in the 3D virtual view projected to the user by the HMD 200. In some embodiments, the information collected by the user sensors may be used in interacting with or manipulating virtual content in the 3D virtual view projected by the HMD 200.

In some embodiments, the user sensors may include one or more eye tracking sensors 214 (e.g., IR cameras with an IR illumination source) that may be used to track position and movement of the user's eyes. In some embodiments, eye tracking sensors 214 may also be used to track dilation of the user's pupils. As shown in FIGS. 2A and 2B, in some embodiments, there may be two eye tracking sensors 214A and 214B, with each eye tracking sensor tracking a respective eye 292A or 292B. In some embodiments, the information collected by the eye tracking sensors 214 may be used to adjust the rendering of images to be projected, and/or to adjust the projection of the images by the projection system of the HMD 200, based on the direction and angle at which the user's eyes are looking. For example, in some embodiments, content of the images in a region around the location at which the user's eyes are currently looking may be rendered with more detail and at a higher resolution than content in regions at which the user is not looking, which allows available processing time for image data to be spent on content viewed by the foveal regions of the eyes rather than on content viewed by the peripheral regions of the eyes. Similarly, content of images in regions at which the user is not looking may be compressed more than content of the region around the point at which the user is currently looking. In some embodiments, the information collected by the eye tracking sensors 214 may be used to match direction of the eyes of an avatar of the user 290 to the direction of the user's eyes. In some embodiments, brightness of the projected images may be modulated based on the user's pupil dilation as determined by the eye tracking sensors 214.

As shown in the non-limiting example HMD 200 of FIGS. 2A through 2C, in some embodiments there may be two eye tracking sensors 214A and 214B located on an inner surface of the HMD 200 at positions such that the sensors 214A and 214B have views of respective ones of the user 290's eyes 292A and 292B. However, in various embodiments, more or fewer eye tracking sensors 214 may be used in a HMD 200, and sensors 214 may be positioned at other locations. In an example non-limiting embodiment, each eye tracking sensor 214 may include an IR light source and IR camera, for example a 400×400 pixel count camera with a frame rate of 120 FPS or greater, HFOV of 70 degrees, and with a working distance of 10 millimeters (mm) to 80 mm.

In some embodiments, the user sensors may include one or more eyebrow sensors 215 (e.g., IR cameras with IR illumination) that track expressions of the user's eyebrows/forehead. In some embodiments, the user sensors may include one or more lower jaw tracking sensors 216 (e.g., IR cameras with IR illumination) that track expressions of the user's mouth/jaw. For example, in some embodiments, expressions of the brow, mouth, jaw, and eyes captured by sensors 214, 215, and 216 may be used to simulate expressions on an avatar of the user 290 in the virtual space, and/or to selectively render and composite virtual content for viewing by the user based at least in part on the user's reactions to the content projected in the 3D virtual view.

As shown in the non-limiting example HMD 200 of FIGS. 2A through 2C, in some embodiments there may be two eyebrow sensors 215A and 215B located on an inner surface of the HMD 200 at positions such that the sensors 215A and 215B have views of the user 290's eyebrows and forehead. However, in various embodiments, more or fewer eyebrow sensors 215 may be used in a HMD 200, and sensors 215 may be positioned at other locations than those shown. In an example non-limiting embodiment, each eyebrow sensor 215 may include an IR light source and IR camera, for example a 250×250 pixel count camera with a frame rate of 60 FPS, HFOV of 60 degrees, and with a working distance of approximately 5 mm. In some embodiments, images from the two sensors 215A and 215B may be combined to form a stereo view of the user's forehead and eyebrows.

As shown in the non-limiting example HMD 200 of FIGS. 2A through 2C, in some embodiments there may be two lower jaw tracking sensors 216A and 216B located on an inner surface of the HMD 200 at positions such that the sensors 216A and 216B have views of the user 290's lower jaw and mouth. However, in various embodiments, more or fewer lower jaw tracking sensors 216 may be used in a HMD 200, and sensors 216 may be positioned at other locations than those shown. In an example non-limiting embodiment, each lower jaw tracking sensor 216 may include an IR light source and IR camera, for example a 400×400 pixel count camera with a frame rate of 60 FPS, HFOV of 90 degrees, and with a working distance of approximately 30 mm. In some embodiments, images from the two sensors 216A and 216B may be combined to form a stereo view of the user's lower jaw and mouth.

In some embodiments, the user sensors may include one or more hand sensors 217 (e.g., IR cameras with IR illumination) that track position, movement, and gestures of the user's hands, fingers, and/or arms 294. For example, in some embodiments, detected position, movement, and gestures of the user's hands, fingers, and/or arms 294 may be used to simulate movement of the hands, fingers, and/or arms of an avatar of the user 290 in the virtual space. As another example, the user's detected hand and finger gestures may be used to determine interactions of the user with virtual content in the virtual space, including but not limited to gestures that manipulate virtual objects, gestures that interact with virtual user interface elements displayed in the virtual space, etc.

As shown in the non-limiting example HMD 200 of FIGS. 2A through 2C, in some embodiments there may be one hand sensor 217 located on a bottom surface of the HMD 200. However, in various embodiments, more than one hand sensor 217 may be used, and hand sensor 217 may be positioned at other locations. In an example non-limiting embodiment, hand sensor 217 may include an IR light source and IR camera, for example a 500×500 pixel count camera with a frame rate of 120 FPS or greater, HFOV of 90 degrees, and with a working distance of 0.1 m to 1 m.

Figure 3:
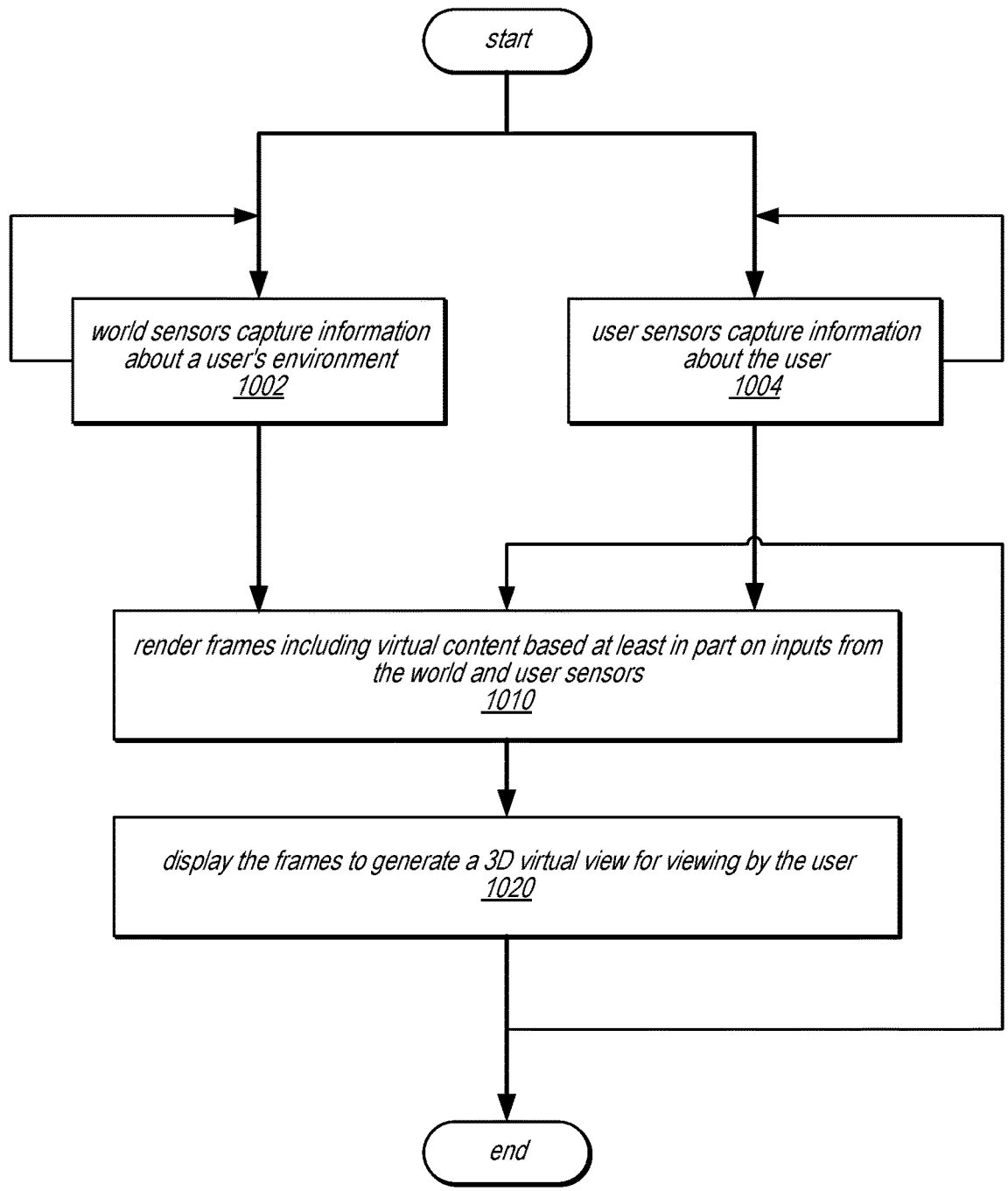
FIG. 3 is a flowchart of a method of operation for a mixed reality system as illustrated in FIGS. 1 through 2C, according to at least some embodiments.

FIG. 3 is a high-level flowchart of a method of operation for a mixed reality system as illustrated in FIGS. 1 through 2C, according to at least some embodiments. The mixed reality system may include a HMD such as a headset, helmet, goggles, or glasses that includes a projector mechanism for projecting or displaying frames including left and right images to a user's eyes to thus provide 3D virtual views to the user. The 3D virtual views may include views of the user's environment augmented with virtual content (e.g., virtual objects, virtual tags, etc.).

As indicated at 1002, one or more world sensors on the HMD may capture information about the user's environment (e.g., video, depth information, lighting information, etc.), and provide the information as inputs to a controller of the mixed reality system. As indicated at 1004, one or more user sensors on the HMD may capture information about the user (e.g., the user's expressions, eye movement, hand gestures, etc.), and provide the information as inputs to the controller of the mixed reality system. Elements 1002 and 1004 may be performed in parallel, and as indicated by the arrows returning to elements 1002 and 1004 may be performed continuously to provide input to the controller of the mixed reality system as the user uses the mixed reality system. As indicated at 1010, the controller of the mixed reality system may render frames including virtual content based at least in part on the inputs from the world and user sensors. The controller may be integrated in the HMD, or alternatively may be implemented at least in part by a device external to the HMD. As indicated at 1020, the HMD may display the frames generated by the controller to provide a 3D virtual view including the virtual content and a view of the user's environment for viewing by the user. As indicated by the arrow returning to element 1020, the controller may continue to receive and process inputs from the sensors to render frames for display as long as the user is using the mixed reality system.

Note that in some embodiments, to reduce latency for the virtual view of the world that is displayed to the user, at least some video frames of the user's real environment that are captured by the world sensors (video see through cameras) may go directly to the projection system of the device for display to the user; the controller may also receive and process the video frames to composite virtual content into the frames that are then provided to the projection system for display.

FIG. 4 is a block diagram illustrating components of an example mixed reality system, according to at least some embodiments. In some embodiments, a mixed reality system 1900 may include a HMD 2000 such as a headset, helmet, goggles, or glasses. HMD 2000 may implement any of various types of virtual reality projector technologies. For example, the HMD 2000 may include a near-eye VR projector that projects frames including left and right images on screens that are viewed by a user, such as DLP (digital light processing), LCD (liquid crystal display) and LCoS (liquid crystal on silicon) technology projectors. As another example, the HMD 2000 may include a direct retinal projector that scans frames including left and right images, pixel by pixel, directly to the user's eyes. To create a three-dimensional (3D) effect in 3D virtual view 2002, objects at different depths or distances in the two images are shifted left or right as a function of the triangulation of distance, with nearer objects shifted more than more distant objects.

HMD 2000 may include a 3D projector 2020 that implements the VR projection technology that generates the 3D virtual view 2002 viewed by the user, for example near-eye VR projection technology or direct retinal projection technology. In some embodiments, HMD 2000 may also include a controller 2030 configured to implement functionality of the mixed reality system 1900 as described herein and to generate the frames (each frame including a left and right image) that are projected or scanned by the 3D projector 2020 into the 3D virtual view 2002. In some embodiments, HMD 2000 may also include a memory 2032 configured to store software (code 2034) of the mixed reality system that is executable by the controller 2030, as well as data 2038 that may be used by the mixed reality system 1900 when executing on the controller 2030. In some embodiments, HMD 2000 may also include one or more interfaces 2040 (e.g., a Bluetooth technology interface, USB interface, etc.) configured to communicate with an external device 2100 via a wired or wireless connection. In some embodiments, at least a part of the functionality described for the controller 2030 may be implemented by the external device 2100. External device 2100 may be or may include any type of computing system or computing device, such as a desktop computer, notebook or laptop computer, pad or tablet device, smartphone, hand-held computing device, game controller, game system, and so on.

In various embodiments, controller 2030 may be a uniprocessor system including one processor, or a multiprocessor system including several processors (e.g., two, four, eight, or another suitable number). Controller 2030 may include central processing units (CPUs) configured to implement any suitable instruction set architecture, and may be configured to execute instructions defined in that instruction set architecture. For example, in various embodiments controller 2030 may include general-purpose or embedded processors implementing any of a variety of instruction set architectures (ISAs), such as the x86, PowerPC, SPARC, RISC, or MIPS ISAs, or any other suitable ISA. In multiprocessor systems, each of the processors may commonly, but not necessarily, implement the same ISA. Controller 2030 may employ any microarchitecture, including scalar, superscalar, pipelined, superpipelined, out of order, in order, speculative, non-speculative, etc., or combinations thereof. Controller 2030 may include circuitry to implement microcoding techniques. Controller 2030 may include one or more processing cores each configured to execute instructions. Controller 2030 may include one or more levels of caches, which may employ any size and any configuration (set associative, direct mapped, etc.). In some embodiments, controller 2030 may include at least one graphics processing unit (GPU), which may include any suitable graphics processing circuitry. Generally, a GPU may be configured to render objects to be displayed into a frame buffer (e.g., one that includes pixel data for an entire frame). A GPU may include one or more graphics processors that may execute graphics software to perform a part or all of the graphics operation, or hardware acceleration of certain graphics operations. In some embodiments, controller 2030 may include one or more other components for processing and rendering video and/or images, for example image signal processors (ISPs), coder/decoders (codecs), etc.

Memory 2032 may include any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration.

In some embodiments, the HMD 2000 may include at least one inertial-measurement unit (IMU) 2070 configured to detect position, orientation, and/or motion of the HMD 2000, and to provide the detected position, orientation, and/or motion data to the controller 2030 of the mixed reality system 1900.

In some embodiments, the HMD 2000 may include world sensors 2050 that collect information about the user's environment (video, depth information, lighting information, etc.), and user sensors 2060 that collect information about the user (e.g., the user's expressions, eye movement, hand gestures, etc.). The sensors 2050 and 2060 may provide the collected information to the controller 2030 of the mixed reality system 1900. Sensors 2050 and 2060 may include, but are not limited to, visible light cameras (e.g., video cameras), infrared (IR) cameras, IR cameras with an IR illumination source, Light Detection and Ranging (LIDAR) emitters and receivers/detectors, and laser-based sensors with laser emitters and receivers/detectors. World and user sensors of an example HMD are shown in FIGS. 2A through 2C.

The HMD 2000 may be configured to render and display frames to provide a 3D virtual view 2002 for the user at least in part according to world sensor 2050 and user sensor 2060 inputs. The virtual space 2002 may include renderings of the user's environment, including renderings of real objects 2012 in the user's environment, based on video captured by one or more "video see through" cameras (e.g., RGB (visible light) video cameras) that capture high-quality, high-resolution video of the user's environment in real time for display. The virtual space 2002 may also include virtual content (e.g., virtual objects, 2014, virtual tags 2015 for real objects 2012, avatars of the user, etc.) generated by the mixed reality system 1900 and composited with the projected 3D view of the user's real environment. FIG. 3 describes an example method for collecting and processing sensor inputs to generate content in a 3D virtual view 2002 that may be used in a mixed reality system 1900 as illustrated in FIG. 4, according to some embodiments.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:
a controller comprising one or more processors; and
a head-mounted display (HMD) configured to display a 3D virtual view to a user,
wherein the HMD comprises:
left and right displays for displaying frames including left and right images to the user's eyes to provide the 3D virtual view to the user;
a plurality of sensors configured to collect information about the user and the user's environment and provide the information to the controller, wherein the plurality of sensors includes:
one or more cameras configured to capture views of the user's environment;
one or more world mapping sensors configured to determine range information for real objects in the user's environment; and
one or more eye tracking sensors configured to track position and movement of the user's eyes;
wherein the controller is configured to:
determine, based in part on the range information, adjusted depths in accordance with which to render one or more of the real objects in the captured views of the user's environment in the 3D virtual view, wherein the adjusted depths are different from real depths of the one or more real objects in the user's environment captured by the one or more cameras; and
  render frames for display by the HMD that include the one or more of the real objects in the captured views of the user's environment rendered in accordance with the adjusted depths for the one or more of the real objects and virtual content composited into the captured views of the user's environment based at least in part on the range information from the one or more world mapping sensors and the position and movement of the user's eyes as tracked by the one or more eye tracking sensors.

2. The system as recited in claim 1, wherein the controller is configured to determine depths at which to render the virtual content in the 3D virtual view based at least in part on the range information from the one or more world mapping sensors.

3. The system as recited in claim 1, wherein the controller is configured to:
  determine a region within the 3D virtual view at which the user is looking based on the position of the user's eyes as determined by the one or more eye tracking sensors; and
  render content in the determined region at a higher resolution than in other regions of the 3D virtual view.

4. The system as recited in claim 1, wherein the plurality of sensors further includes:
  one or more head pose sensors configured to capture information about the user's position, orientation, and motion in the environment;
  one or more light sensors configured to capture lighting information including color, intensity, and direction in the user's environment;
  one or more hand sensors configured to track position, movement, and gestures of the user's hands;
  one or more eyebrow sensors configured to track expressions of the user's eyebrows; and
  one or more lower jaw sensors configured to track expressions of the user's mouth and jaw.

5. The system as recited in claim 4, wherein the controller is configured to render lighting effects for the virtual content based at least in part on the lighting information captured by the one or more light sensors.

6. The system as recited in claim 4, wherein the HMD further comprises an inertial-measurement unit (IMU), wherein the controller is configured to:
  augment information received from the IMU with the information captured by the one or more head pose sensors to determine current position, orientation, and motion of the user in the environment; and
  render the frames for display by the HMD based at least in part on the determined current position, orientation, and motion of the user.

7. The system as recited in claim 4, wherein the controller is configured to render an avatar of the user's face for display in the 3D virtual view based at least in part on information collected by the one or more eye tracking sensors, the one or more eyebrow sensors, and the one or more lower jaw sensors.

8. The system as recited in claim 4, wherein the controller is configured to render representations of the user's hands for display in the 3D virtual view based at least in part on information collected by the one or more hand sensors.

9. The system as recited in claim 4, wherein the controller is configured to detect interactions of the user with virtual content in the 3D virtual view based at least in part on information collected by the one or more hand sensors.

10. The system as recited in claim 1, wherein one or more cameras configured to capture views of the user's environment include a left video camera corresponding to the user's left eye and a right video camera corresponding to the user's right eye.

11. A device, comprising:
  a controller comprising one or more processors;
  left and right displays for displaying frames including left and right images to a user's eyes to provide a 3D virtual view to the user;
  a plurality of world-facing sensors configured to collect information about the user's environment and provide the information to the controller, wherein the plurality of world-facing sensors includes:
    one or more cameras configured to capture views of the user's environment;
    one or more world mapping sensors configured to capture depth information in the user's environment;
  a plurality of user-facing sensors configured to collect information about the user and provide the information to the controller, wherein the plurality of user-facing sensors includes one or more eye tracking sensors configured to track position and movement of the user's eyes;
  wherein the controller is configured to:
    determine, based in part on the depth information, adjusted depths in accordance with which to render one or more real objects in the captured views of the user's environment in the 3D virtual view, wherein the adjusted depths are different from real depths of the one or more real objects in the user's environment captured by the one or more cameras; and
    render frames for display that include the one or more real objects in the captured views of the user's environment rendered in accordance with the adjusted depths for the one or more real objects and virtual content composited into the captured views of the user's environment based at least in part on the depth information captured by the one or more world mapping sensors and the position and movement of the user's eyes as tracked by the one or more eye tracking sensors.

12. The device as recited in claim 11, wherein the plurality of world-facing sensors further includes:
  one or more head pose sensors configured to capture information about the user's position, orientation, and motion in the environment; and
  one or more light sensors configured to capture lighting information including color, intensity, and direction in the user's environment.

13. The device as recited in claim 12, wherein the controller is configured to render lighting effects for the virtual content based at least in part on the lighting information captured by the one or more light sensors.

14. The device as recited in claim 12, wherein the device further comprises an inertial-measurement unit (IMU), wherein the controller is configured to augment information received from the IMU with the information captured by the one or more head pose sensors to determine current position, orientation, and motion of the user in the environment.

15. The device as recited in claim 11, wherein the plurality of user-facing sensors further includes:
  one or more hand sensors configured to track position, movement, and gestures of the user's hands;

one or more eyebrow sensors configured to track expressions of the user's eyebrows; and
one or more lower jaw sensors configured to track expressions of the user's mouth and jaw.

16. The device as recited in claim 15, wherein the controller is configured to render an avatar of the user for display in the 3D virtual view based at least in part on information collected by the one or more eye tracking sensors, the one or more eyebrow sensors, the one or more lower jaw sensors, and the one or more hand sensors.

17. The device as recited in claim 15, wherein the controller is configured to detect interactions of the user with virtual content in the 3D virtual view based at least in part on information collected by the one or more hand sensors.

18. A method, comprising:
capturing, by a plurality of world-facing sensors of a head-mounted display (HMD) worn by a user, information about the user's environment, wherein the information about the user's environment includes views of the user's environment and depth information in the user's environment;
capturing, by a plurality of user-facing sensors of the HMD, information about the user, wherein the information about the user includes position and movement of the user's eyes;
determining, by a controller of the HMD, based in part on the depth information, adjusted depths in accordance with which to render one or more real objects in the captured views of the user's environment in the 3D virtual view, wherein the adjusted depths are different from real depths of the one or more real objects in the user's environment captured by the plurality of world-facing sensors;
rendering, by the controller of the HMD, frames for display that include the one or more real objects in the captured views of the user's environment rendered in accordance with the adjusted depths for the one or more real objects and virtual content composited into the captured views of the user's environment based at least in part on the depth information captured by world-facing sensors and the position and movement of the user's eyes captured by the user-facing sensors; and
displaying, by the HMD, the rendered frames to the user to provide a 3D virtual view of the user's environment that includes the virtual content.

19. The method as recited in claim 18, further comprising:
capturing, by the world-facing sensors, information about the user's position, orientation, and motion in the environment and lighting information including color, intensity, and direction in the user's environment;
determining, by the controller, current position, orientation, and motion of the user in the environment based at least in part on the information about the user's position, orientation, and motion in the environment captured by the world-facing sensors; and
rendering, by the controller, lighting effects for the virtual content based at least in part on the lighting information captured by the world-facing sensors.

20. The method as recited in claim 18, further comprising:
tracking, by the user-facing sensors, position, movement, and gestures of the user's hands, expressions of the user's eyebrows, and expressions of the user's mouth and jaw; and
rendering, by the controller, an avatar of the user for display in the 3D virtual view based at least in part on information collected by the plurality of user-facing sensors.

* * * * *